W. S. CUNNINGHAM.
TRANSMISSION GEARING.
APPLICATION FILED APR. 14, 1920.
1,380,192.
Patented May 31, 1921.
3 SHEETS—SHEET 2.
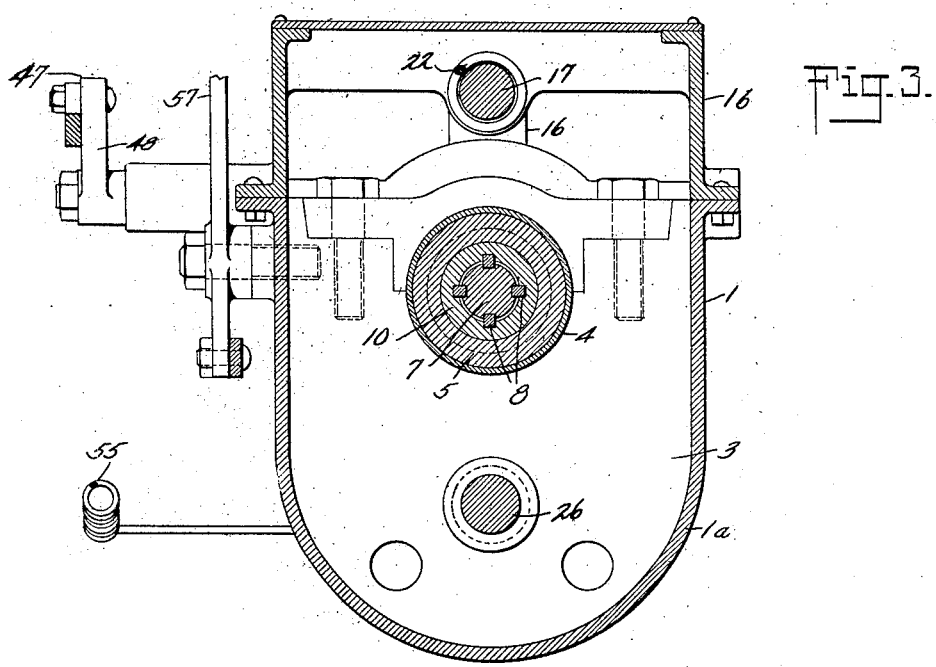
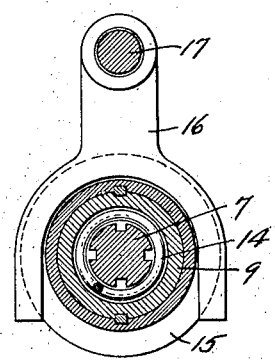
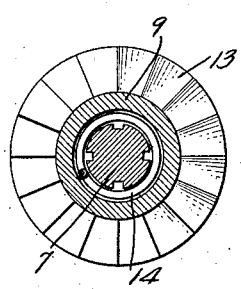
INVENTOR
William S. Cunningham
ATTORNEYS

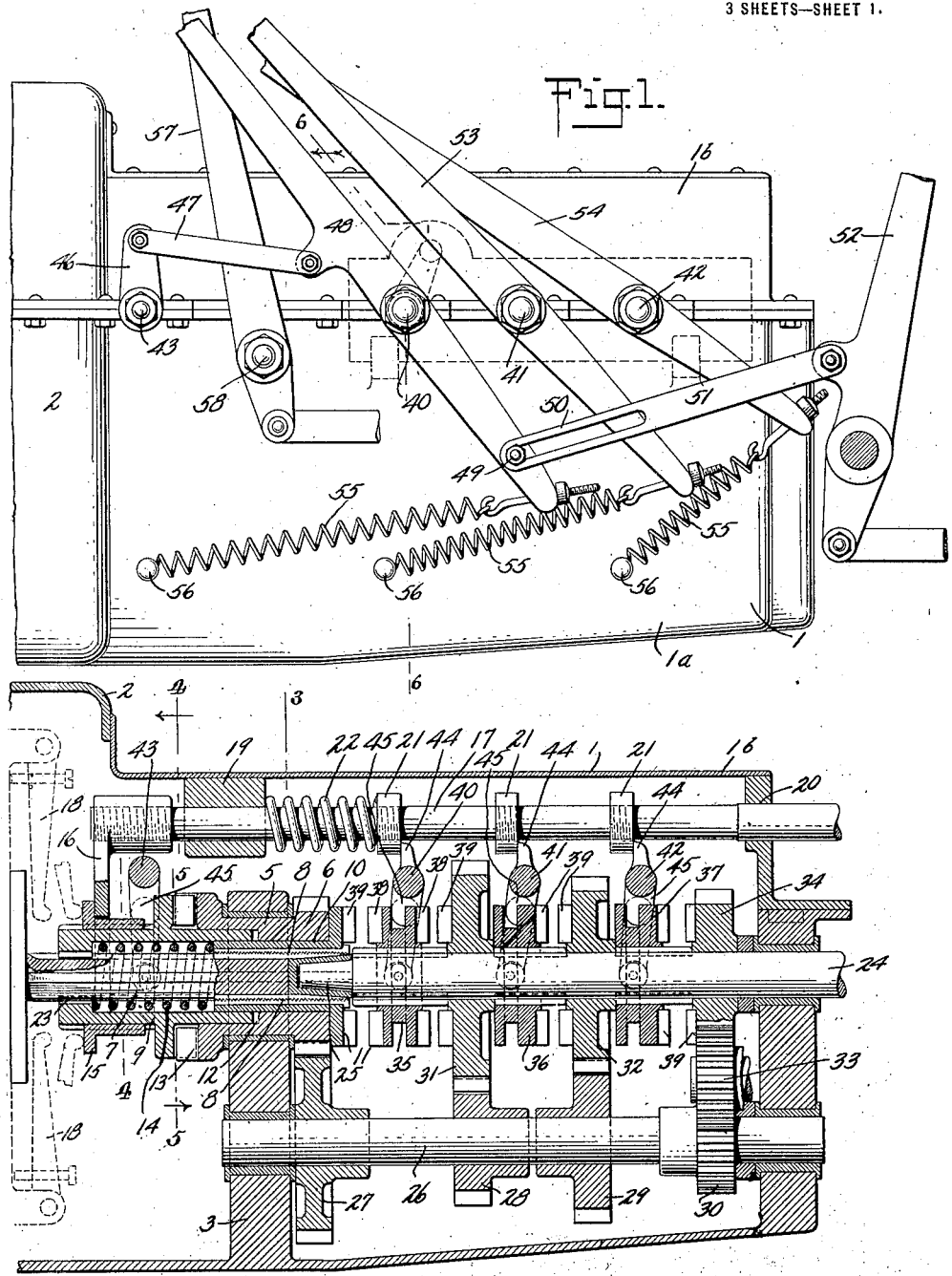

W. S. CUNNINGHAM.
TRANSMISSION GEARING.
APPLICATION FILED APR. 14, 1920.

1,380,192.

Patented May 31, 1921.
3 SHEETS—SHEET 3.

WITNESSES:

INVENTOR
William S. Cunningham
BY
ATTORNEYS

UNITED STATES PATENT OFFICE.

WILLIAM STANTON CUNNINGHAM, OF SHREVEPORT, LOUISIANA.

TRANSMISSION-GEARING.

1,380,192.  Specification of Letters Patent.  Patented May 31, 1921.

Application filed April 14, 1920. Serial No. 373,733.

*To all whom it may concern:*

Be it known that I, WILLIAM S. CUNNINGHAM, a citizen of the United States, and a resident of Shreveport, in the parish of Caddo and State of Louisiana, have invented a new and Improved Transmission-Gearing, of which the following is a full, clear, and exact description.

This invention relates to improvements in transmission gearing, an object of the invention being to provide an improved transmission gearing in which the gears are always in mesh and are operated by an improved arrangement of clutches controlled by foot levers.

A further object is to provide improved means for preventing operation of certain of the levers when one of the levers is in either of its operative positions.

A further object is to provide a construction of the character stated which embodies an improved arrangement of gears and clutches and operating means therefor, which result in a novel and compact apparatus efficiently performing the functions for which it is intended.

With these and other objects in view the invention consists in certain novel features of construction, and combinations and arrangements of parts as will be more fully hereinafter described and pointed out in the claims.

In the accompanying drawings—

Figure 1 is a view in side elevation illustrating my invention;

Fig. 2 is a view in longitudinal section;

Fig. 3 is a view in section on the line 3—3 of Fig. 2;

Fig. 4 is a view in section on the line 4—4 of Fig. 2;

Fig. 5 is a view in section on the line 5—5 of Fig. 2;

Figure 6:
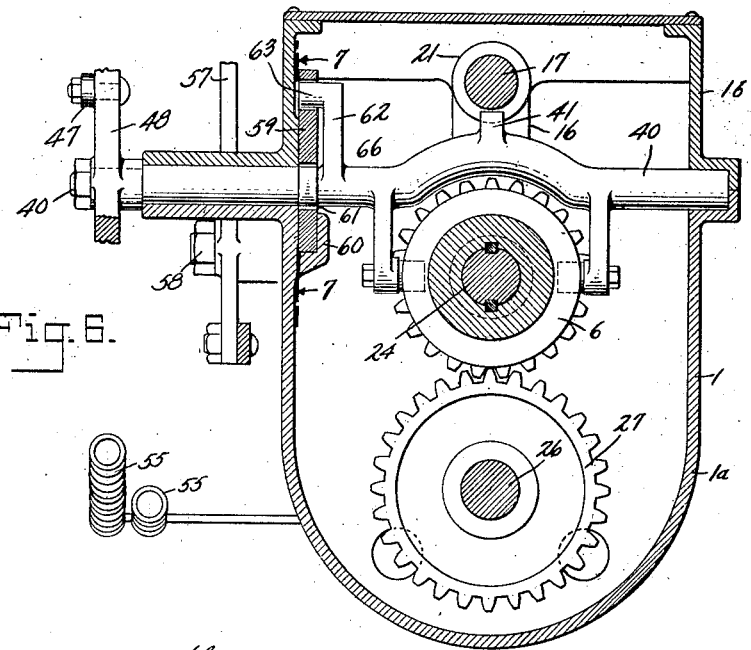
Fig. 6 is a view in section on the line 6—6 of Fig. 1.

1 represents the casing of my improved gearing which is connected to the ends of a casing 2 in any approved manner. The casing 1 comprises two parts; namely, a lower portion 1ª and an upper removable section 1ᵇ. A transverse post 3 is mounted in the bottom portion of the casing 1 and has a bearing 4 for the sleeve 5 of a gear wheel 6.

This gear wheel 6 is loose on a sleeve 10 of a clutch member 11 and the latter is screwed onto the end of a drive shaft 7 and is held against rotary movement by keys 8. A sleeve 9 is mounted on the drive shaft 7 and at one end is movable on the sleeve 10 in a recess 12 in the gear sleeve 5. This sleeve 9 constitutes a clutch engaging one end of the gear sleeve 5, as shown at 13.

A flanged collar 15 is keyed to the clutch sleeve 9 and is operated by a yoke 16 on a longitudinal rod 17 to move the arms 18 of the ordinary power clutch with which engines are ordinarily provided when low speed, intermediate speed and reverse motion are desired.

A coiled spring 14 is located around the drive shaft 7 and exerts longitudinal pressure on the sleeve 9 tending to separate the clutch members 13, and to thrust the flanged collar 15 forward to move the arms 18 of the power clutch when high speed is desired.

The rod 17 is mounted to move longitudinally in a hanger 19 and a bearing 20 in one end of the casing 1 and is provided with fixed collars 21 spaced apart with a coiled spring 22 between one of these collars and the hanger 19 holding the rod in normal position.

It is, of course, to be understood that the clutch sleeve 9 is keyed to the drive shaft 7, as shown at 23, so that when the sleeve 9 is moved in one direction to bring the clutch members 13 together, the rear wheel 6 will be locked to turn with the drive shaft.

24 represents the driven shaft which is located in alinement with the drive shaft and has a thrust bearing 25 in the end of the drive shaft as clearly shown in Fig. 2. A countershaft 26 is mounted in the lower portion of the casing 1 and on this countershaft four gear wheels 27, 28, 29 and 30 are fixed. The gear wheel 27 is always in mesh with the gear wheel 6. The gear wheel 28, which is relatively small, is in engagement with a relatively large gear wheel 31 loose on the shaft 24. The gear wheel 29, which is of larger diameter than the gear wheel 28, is in mesh with a gear wheel 32, the latter also loose on the shaft 24. The gear wheel 30 is in mesh with an idle gear 33 and the latter in mesh with a gear wheel 34 loose on the shaft 24 and these three gears 30, 33 and 34 constitute the reversing gears. While the gear wheels 31, 32 and 34 are loose on the shaft 24, they are not slidable on the shaft.

The shaft 24 supports three clutches 35, 36 and 37 and these clutches are keyed to the shaft and control the locking of the gears to the shaft. The clutch 35, when in neutral position, is equally spaced between gears 6 and 31 and is provided at its opposite ends with clutch engaging faces 39 to engage corresponding clutch faces 39 on the gears 6 and 31 respectively. The clutch 36 at one end is made with a gear clutching face 39 to engage a similar face 39 on the gear 32 and the clutch 37 has a clutching face 39 to engage a similar face on the gear 34.

Rocker shafts 40, 41, 42 and 43 are supported transversely in the casing. The rocker shafts 40, 41 and 42 have fingers 44 which engage the collars 21 and all of these rocker shafts have forks 45 engaging the clutches 9, 35, 36 and 37 respectively to compel said clutches to move with the rocker shafts. A crank arm 46 is secured on the outer end of the rocker shaft 43 and connected by a link 47 with a foot lever 48. This foot lever 48 is fixed to the rocker shaft 40 and at its lower end is provided with a pin 49 movable in a slot 50 in a link 51, said link 51 being connected to a hand brake lever 52. A foot lever 53 is fixed to the rocker shaft 41 and a foot lever 54 is fixed to the rocker shaft 42. Coiled springs 55 connect the lower ends of the levers 48, 53 and 54 with fixed pins 56 on the casing 1 and hold the levers in normal position.

57 represents a foot lever which is pivotally supported as shown at 58, and is adapted to operate the brake of the car and this foot lever is supported on the casing 1 as shown in Fig. 1.

Against the inner face of the casing 1 a plate 59 is mounted to slide in a suitable bearing 60. This plate 59 is made with a longitudinal slot 61 receiving the rocker shafts 40, 41 and 42 and the rocker shaft 40 is provided with a crank arm 62 having a crank pin 63 thereon, which is projected through an opening 64 in the plate 59 so that when the rocker shaft 40 is turned, it will compel the plate 59 to move longitudinally.

Figure 7:
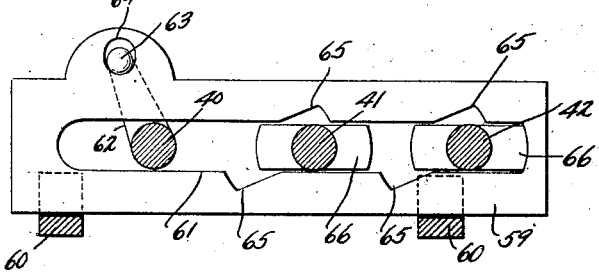
Fig. 7 is a view in section on the line 7—7 of Fig. 6.
Figure 8:
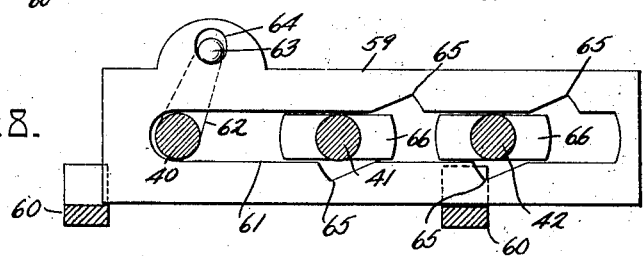
Figs. 8 and 9 are views similar to Fig. 7 showing the parts in different positions.

This plate 59 is made in the walls of its slot 61 with recesses 65 and elongated blocks 66 are fixed to the rocker shafts 41 and 42. These blocks 66 are of substantially the same width as the slot 61 so that when the plate 59 is moved by the rocker shaft 40 to position the clutch 35 in either of its operative positions as indicated in Figs. 7 and 8, the rocker shafts 41 and 42 will be held against turning movement by reason of the engagement of the blocks 66 with the walls of the slot.

Figure 9:
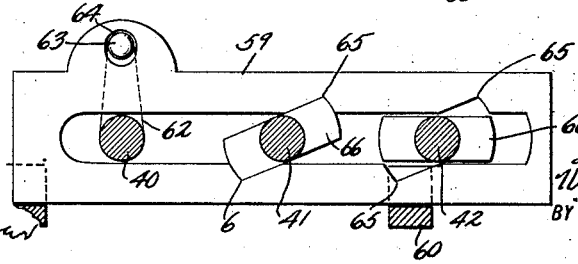

When, however, the clutch 35 is in neutral position, the parts will be in the position shown in Fig. 9, and either of the rocker shafts 41 or 42 can be operated to move the clutches controlled thereby. Hence, with this improved arrangement of plate 59 and coöperating parts, it is impossible to move either of the clutches 36 or 37 except when the clutch 35 is in neutral position because the blocks 66 cannot turn until their end portions are in register with the recesses 65 and this situation occurs only when the clutch 35 is in neutral position as indicated in Fig. 9.

The operation is as follows: It is to be understood that the levers operate very much as the foot levers of the ordinary Ford control with the exception that I provide an additional lever 53 to give an intermediate speed.

Assuming the parts to be as shown in Fig. 1 and the engine started, the lever 48 at its upper end is moved to the left of Fig. 1, thereby, through the medium of the rocker shaft 40, forcing the clutch 35 into engagement with the gear wheel 31 locking the latter to the drive shaft 24. At the same time this movement of the lever 48, through the medium of the link 47, crank arm 46 and rocker shaft 43, will move the clutch sleeve 9 into locked engagement with the gear wheel 6 so that the transmission will be from the drive shaft 7 through gear wheels 6, 27, 28 and 31 to the shaft 24. Pressure on the lever 48 locks the power clutch by means of the fingers 44 thrusting the rod 17, yoke 16, and flanged collar 15 against the power clutch arms 18 producing low speed. The lever 48 is then allowed to return to its former or neutral position. If desired, the clutch 35 can then be moved from neutral position, after the engine has been allowed to race, and then can be moved into locked engagement with the gear 6, thus locking the shafts 7 and 24 directly together, and the rocker arm 43 with its fork 45 now exerting no rearward pressure on sleeve 9, the spring 14 forces sleeve 9 with its collar 15 forward against the arms 18, locking the power clutch, and producing high speed.

It is to be understood that the lever 48 operates as the ordinary clutch lever of the Ford car. Namely, it operates first in one direction to throw the gear into low and then, when permitted to come all of the way back, causes the clutch 35 to move into high, and when in an intermediate position, holds the clutch out of engagement with either of the gears. When the clutch 35 is in its intermediate position, the lever 53 can be operated to throw the clutch 36 into locked engagement with the gear 32 which will be an intermediate speed, or when it is desired to reverse, the clutch 37 is operated by its lever 54 to lock the gear 34 to the shaft 24, the locking of power clutch being accomplished as in low speed.

It is, of course, to be understood that the brake must be released before the clutches are operated as in the ordinary Ford car and that the brake can be controlled either by the hand lever 52 or the foot lever 57.

With my improved gearing, the gears are always in mesh and there is no danger of stripping of gears by the shifting of the clutches and the parts can be operated in the ordinary succession or be moved directly from low to high as in the Ford construction.

Various slight changes might be made in the general form and arrangement of parts described without departing from the invention, and hence I do not limit myself to the precise details set forth, but consider myself at liberty to make such changes and alterations as fairly fall within the spirit and scope of the appended claims.

I claim:

1. A transmission gearing, comprising a drive shaft, a driven shaft in alinement with the drive shaft, a countershaft parallel to the driven shaft, gear wheels fixed to the countershaft and meshing with gear wheels loose on the drive shaft and the driven shaft, clutches for locking the gears on the drive and driven shafts to said shafts, and foot levers operating the clutches.

2. A transmission gearing, comprising a drive shaft, a driven shaft in alinement with the drive shaft, a countershaft parallel to the driven shaft, gear wheels fixed to the countershaft and meshing with gear wheels loose on the drive shaft and the driven shaft, clutches for locking the gear wheels on the drive shaft and driven shaft to said shafts, rocker shafts, forks on the rocker shafts engaging the clutches, and foot levers on the outer ends of the rocker shafts.

3. A transmission gearing, comprising a drive shaft, a driven shaft in alinement with the drive shaft, a countershaft parallel to the driven shaft, gear wheels fixed to the countershaft and meshing with gear wheels loose on the drive shaft and the driven shaft, clutches adapted to lock the gear wheels of the drive shaft and the driven shaft to said shafts, rocker shafts controlling the clutches, fingers on the rocker shafts, a longitudinally movable spring pressed rod, shoulders on the rod engaging said finger, and clutch operated mean controlled by the movement of the rod to lock the drive shaft to the engine operating the same.

4. A transmission gearing, comprising a drive shaft, a driven shaft in alinement with the drive shaft, a countershaft parallel to the driven shaft, gear wheels fixed to the countershaft and meshing with gear wheels loose on the drive shaft and the driven shaft, said driven shaft having a thrust bearing in the end of the drive shaft, clutches controlling the locking engagement of the gears on the drive shaft and the driven shaft with said shafts, foot levers controlling the clutches, and means connecting one of said foot levers with the drive shaft clutch compelling said clutches to operate simultaneously.

5. A transmission gearing, comprising a drive shaft, a driven shaft, a countershaft, gear wheels connecting the countershaft with the drive shaft and the driven shaft, clutches controlling the locking engagement of the gear wheels on the driven shaft with said shaft, rocker shafts, foot levers on the rocker shafts, and means preventing movement of certain of the rocker shafts when one of said rocker shafts is turned.

6. A transmission gearing, comprising a drive shaft, a driven shaft, a countershaft, gear wheels connecting the countershaft with the drive shaft and the driven shaft, clutches controlling the locking engagement of the gear wheels on the driven shaft with said shaft, rocker shafts, a plate having a slot therein movable on the rocker shafts, a crank arm on one of the rocker shafts constructed to move the plate, and said plate constructed to prevent rotary movement of the other of said rocker shafts except when said first-mentioned rocker shaft is in an intermediate position.

7. A transmission gearing, comprising a drive shaft, a driven shaft, a countershaft, gear wheels connecting the countershaft with the drive shaft and the driven shaft, clutches controlling the locking engagement of the gear wheels on the driven shaft with said shaft, rocker shafts, a plate having a slot therein movable on the rocker shafts, a crank arm on one of the rocker shafts constructed to move the plate, said plate having recesses in its walls, and blocks on the other of said rocker shafts normally held against turning movement by the walls of the slot but permitted turning movement into the recesses when said first-mentioned rocker shaft is in an intermediate position.

8. A transmission gearing, comprising a drive shaft, a driven shaft, and a countershaft, gear wheels connecting said shafts, said gear wheels being of different relative sizes, an idle gear connecting two of the gears and constituting a reversing gear, foot levers controlling the operation of said gears, one of said foot levers having an intermediate position and extreme positions at opposite sides thereof controlling the high and low speed gear transmissions, other of said levers controlling the intermediate and the reverse gears, and means preventing operation of the last-mentioned gears except when said first-mentioned lever is in its intermediate position.

9. A transmission gearing, comprising a drive shaft, a driven shaft in alinement with the drive shaft, a countershaft parallel to the driven shaft, gear wheels fixed to the countershaft and meshing with gear wheels loose on the drive and the driven shafts, a clutch adapted to lock the drive gear with the drive gear shaft, clutches adapted to lock the gears on the driven shaft to said shaft, an idle gear connecting one gear of the countershaft with one of the gears of the driven shaft and constituting a reversing gear, and means for operating the clutches.

10. A transmission gearing, comprising a drive shaft, a driven shaft in alinement with the drive shaft, a sliding clutch sleeve on the drive shaft, a spring engaging said sleeve, a movable member on the clutch sleeve, and power clutch arms engaged by said last-mentioned member when moved by the spring, whereby the clutch is locked in high speed.

11. A transmission gearing, comprising a drive shaft, a driven shaft in alinement with the drive shaft, a sliding clutch sleeve on the drive shaft, a spring engaging said sleeve, a movable member on the clutch sleeve, power clutch arms engaged by said last-mentioned member when moved by the spring, whereby the clutch is locked in high speed, and foot pedals operatively connected to said parts, whereby said power clutch may be locked in low speed, intermediate and reverse.

WILLIAM STANTON CUNNINGHAM.